US012802344B2

(12) United States Patent
Vandewalle et al.

(10) Patent No.: US 12,802,344 B2
(45) Date of Patent: Nov. 17, 2026

(54) LAYERED VIEW SYNTHESIS SYSTEM AND METHOD

(71) Applicant: LEIA Inc., Menlo Park, CA (US)

(72) Inventors: Patrick Vandewalle, Sint-Katelijne-Waver (BE); Loïc Dehan, Sint-Katelijne-Waver (BE); Wiebe Van Ranst, Sint-Katelijne-Waver (BE)

(73) Assignee: LEIA Inc., Nashua, NH (US)

( * ) Notice: Subject to any disclaimer, the term of this patent is extended or adjusted under 35 U.S.C. 154(b) by 119 days.

(21) Appl. No.: 18/864,456

(22) PCT Filed: May 27, 2023

(86) PCT No.: PCT/US2023/023785
§ 371 (c)(1),
(2) Date: Nov. 8, 2024

(87) PCT Pub. No.: WO2023/235273
PCT Pub. Date: Dec. 7, 2023

(65) Prior Publication Data

US 2025/0299428 A1 Sep. 25, 2025

Related U.S. Application Data

(60) Provisional application No. 63/348,450, filed on Jun. 2, 2022.

(51) Int. Cl.
*G06T 15/20* (2011.01)
*G06T 5/30* (2006.01)
(Continued)

(52) U.S. Cl.
CPC .............. *G06T 15/205* (2013.01); *G06T 5/30* (2013.01); *G06T 5/50* (2013.01); *G06T 5/60* (2024.01);
(Continued)

(58) Field of Classification Search
None
See application file for complete search history.

(56) References Cited

U.S. PATENT DOCUMENTS

2017/0188002 A1 6/2017 Chan et al.
2019/0057513 A1* 2/2019 Jain .......................... G06T 7/593
(Continued)

FOREIGN PATENT DOCUMENTS

CN 113838191 A 12/2021
CN 114004773 A 2/2022
(Continued)

OTHER PUBLICATIONS

Maxime Daisy, Pierre Buyssens, David Tschumperlé, Olivier Lézoray, "A Smarter Exemplar-based Inpainting Algorithm Using Local and Global Heuristics for More Geometric Coherence", 2014, IEEE International Conference on Image Processing (ICIP 2014), Paris, France. hal-01080029 (Year: 2014).*
(Continued)

*Primary Examiner* — Michael J Cobb
(74) *Attorney, Agent, or Firm* — Schwegman, Lundberg & Woessner, P.A.

(57) ABSTRACT

A method of computer-implemented synthesized view image generation and a synthesized view image generation system provide layered view synthesis. The method includes receiving an input image having a plurality of pixels having color values; generating a dilated depth map by dilating a depth map associated with the input image, the depth map with depth values respectively associated with each pixel in the input image; determining an inpainting mask using the dilated depth map; performing an inpainting operation based on the inpainting mask and the input image to generate a
(Continued)

background image; and rendering a synthesized view image using the background image, the input image, and the dilated depth map.

17 Claims, 12 Drawing Sheets

(51) Int. Cl.

| | |
|---|---|
| ***G06T 5/50*** | (2006.01) |
| ***G06T 5/60*** | (2024.01) |
| ***G06T 5/70*** | (2024.01) |
| ***G06T 5/77*** | (2024.01) |
| ***G06T 7/50*** | (2017.01) |
| ***H04N 13/268*** | (2018.01) |

(52) U.S. Cl.

CPC .................. *G06T 5/70* (2024.01); *G06T 5/77* (2024.01); *G06T 7/50* (2017.01); *H04N 13/268* (2018.05); *G06T 2207/10028* (2013.01); *G06T 2207/20081* (2013.01); *G06T 2207/20212* (2013.01)

(56) References Cited

U.S. PATENT DOCUMENTS

| | | | |
|---|---|---|---|
| 2021/0042952 A1 | 2/2021 | Jain et al. | |
| 2022/0156887 A1 | 5/2022 | Lin et al. | |
| 2024/0249422 A1 * | 7/2024 | Jampani .................... | G06T 5/77 |

FOREIGN PATENT DOCUMENTS

| | | |
|---|---|---|
| CN | 114463408 A | 5/2022 |
| JP | 2025521159 | 7/2025 |
| WO | WO-2023235273 A1 | 12/2023 |

OTHER PUBLICATIONS

Loic Dehan, Wiebe Van Ranst, Patrick Vandewalle, Sint-Katelijne-Waver, “Layered View Synthesis for General Images”, 2023, Electronic Imaging, pp. 104-1-104-6, https://doi.org/10.2352/EI.2023.35.17.3DIA-104 (Year: 2023).*

Soo Ye Kim, Jianming Zhang, Simon Niklaus, Yifei Fan, Simon Chen, Zhe Lin, Munchurl Kim, “Layered Depth Refinement with Mask Guidance”, 2022, Proceedings of the IEEE/CVF Conference on Computer Vision and Pattern Recognition (CVPR), pp. 3855-3865 (Year: 2022).*

“International Application Serial No. PCT/US2023/023785, International Search Report mailed Sep. 20, 2023”, 4 pgs.

“International Application Serial No. PCT/US2023/023785, Written Opinion mailed Sep. 20, 2023”, 4 pgs.

“European Application Serial No. 23816621.9, Response filed Jan. 20, 2026 to Extended European Search Report mailed Jul. 22, 2025”, 3 pgs.

“International Application Serial No. PCT US2023 023785, International Preliminary Report on Patentability mailed Dec. 12, 2024”, 6 pgs.

“European Application Serial No. 23816621.9, Extended European Search Report mailed Jul. 22, 2025”, 5 pgs.

Meng-Li, Shih, “3D Photography Using Context-Aware Layered Depth Inpainting”, 2020 IEEE CVF Conference on Computer Vision and Pattern Recognition (CVPR), IEEE pp. 8025-8035, (Jun. 13, 2020), 11 pgs.

Yoon, Soo Sung, “Inter-view consistent hole filling in view extrapolation for multi-view image generation”, 2014 IEEE International Conference on Image Processing (ICIP), IEEEpp. 2883-2887, (Oct. 27, 2014), 5 pgs.

* cited by examiner

700

800

1000

LAYERED VIEW SYNTHESIS SYSTEM AND METHOD

CROSS-REFERENCE TO RELATED APPLICATIONS

This application is a U.S. National Stage Filing under 35 U.S.C. 371 from International Application No. PCT/US2023/023785, filed on May 27, 2023, and published as WO 2023/235273, which claims priority to U.S. Provisional Patent Application Ser. No. 63/348,450, filed Jun. 2, 2022, the entirety of which are incorporated by reference herein.

BACKGROUND

To perceive a scene in three dimensions, the left and right eye see an image view of the scene from a slightly different perspective. Each eye has a slightly different point of view, causing objects at different depths to 'shift' in position between the image perceived in the left and right eyes. Thus, for an observer to perceive an image as a three-dimensional (3D) image, it is necessary to present two different perspectives to the two eyes. In AR/VR headsets, this is done by displaying a left and a right eye perspective on the left and the right screen of the glasses. Similarly, glasses-free 3D displays steer a separate view to each eye, allocating a subset of the display pixels to each view. Moreover, multiview displays can be provided in which a different view perspective is provided to three or more viewing directions, such that a viewer perceives different perspective views as they move around the multiview display.

Meanwhile, whilst 3D or multiview cameras do exist, it is typical to acquire a single two dimensional (2D) image, providing a single perspective view of the scene. Thus, it is desirable to take a single 2D image of a scene and generate images of one or more additional view perspectives such that the scene can be visualized in 3D.

Methods of generating synthesized perspective view images have been previously reported, but these methods often give rise to visual artefacts in the synthesized image such as striping and dilation artefacts. Moreover, previously reported methods are typically not robust to multi-level occlusion, that is where different features in the image which partially occlude one another correspond to a series of depths.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Figure 1A:
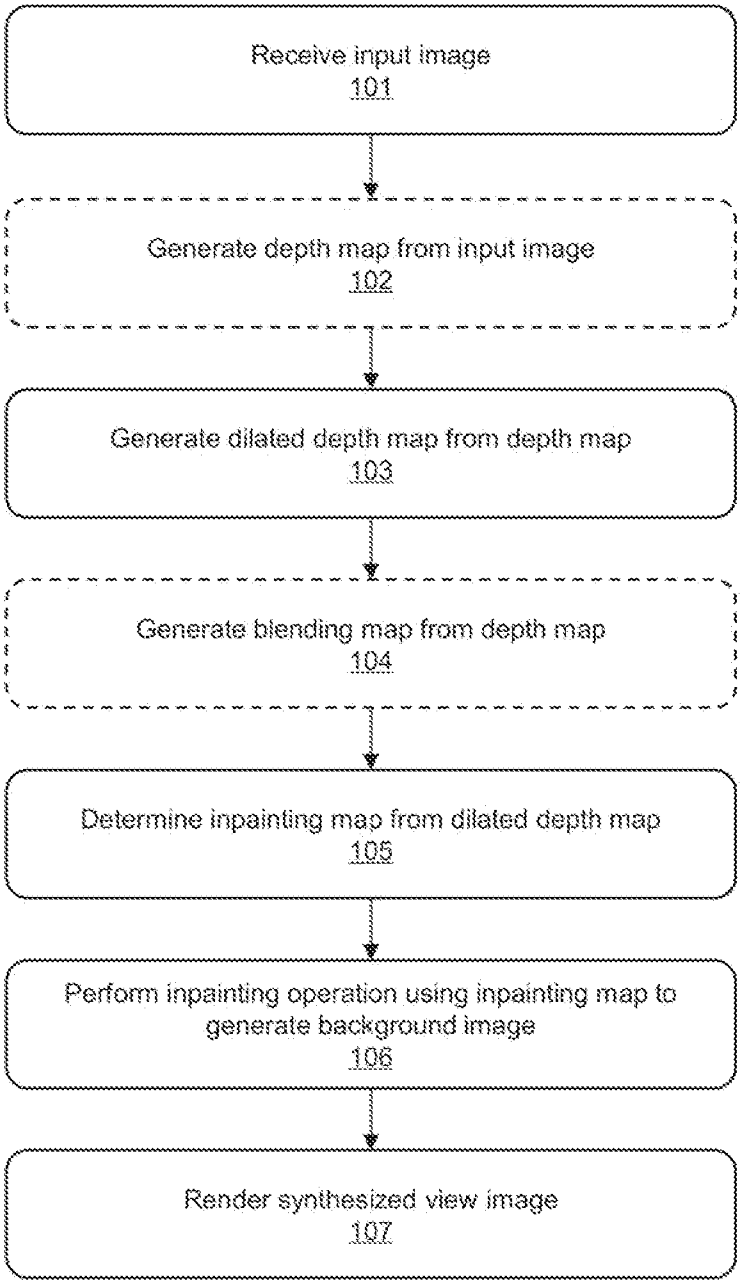
FIG. 1*a* illustrates a flow chart of the steps of a method of computer-implemented synthesized view image generation, according to an embodiment consistent with the principles described herein.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein, in which a method of computer-implemented synthesized view image generation is provided. By way of the method described herein, an input image comprising a plurality of pixels having color values is received, a dilated depth map is generated by dilating a depth map associated with the input image, the depth map comprising depth values respectively associated with each pixel in the input image. The depth map may be generated from the input image. A blending map may also be generated from the depth map, the blending map comprising blending values respectively associated with each pixel in the depth map. The dilated depth map is used to determine an inpainting mask and an inpainting operation is performed based on the inpainting mask and the input image to generate a background image. A synthesized view image is then rendered using the background image, the input image, the dilated depth map, and (if a blending map has been generated) the blending map. A computer system and a computer program product are also described.

By way of the described method, it has been found that visual artefacts in the synthesized images can be mitigated or in some cases eliminated. Moreover, the described method has been found to be more robust against artefacts arising from multilevel occlusion within an input image.

Herein, a 'two dimensional image' or '2D image' is defined as a set of pixels, each pixel having an associated intensity and/or color value. For example, a 2D image may be a 2D RGB image where, for each pixel in the image, relative intensities for red (R), green (G) and blue (B) are provided. A 2D image will generally represent a perspective view of a scene or object.

In contrast herein, a stereoscopic image is defined as a pair of images, respectively corresponding to the perspective view of a scene or object from the viewpoint of each of the left and right eye of a viewer. In further contrast herein, a 'multiview image' is an image which comprises different view images, wherein each view image represents a different perspective view of a scene or object of the multiview image. A multiview image explicitly provides three or more perspective views.

Herein, a 'multiview display' is defined as an electronic display or display system configured to provide different views of a multiview image in or from different view directions. Multiview displays can be provided as part of various devices which include, but are not limited to, mobile telephones (e.g., smart phones), watches, tablet computers, mobile computers (e.g., laptop computers), personal computers and computer monitors, automobile display consoles, camera displays, and various other mobile as well as substantially non-mobile display applications and devices. The multiview display may display the multiview image by providing different views of the multiview image in different view directions relative to the multiview display.

Herein, a 'depth map' is defined as a map which provides information indicative of the absolute or relative distance of objects depicted in an image to the camera (or equivalently to the viewpoint to which the image corresponds). By definition, a depth map comprises a plurality of pixels, each pixel having a depth value, a depth value being a value indicative of the distance of the object at that pixel within the depth map relative to the viewpoint for the image. The depth map may have a one-to-one correspondence with the image, that is to say, for each pixel in the image, the depth map provides a depth value at a corresponding pixel. As will be appreciated, however, the depth map may provide coarser granularity, and the depth map may have a lower resolution than the corresponding image, wherein each pixel within the depth map provides a depth value for multiple pixels within the image. A depth map with lower resolution than its corresponding image may be referred to as a down-sampled depth map.

Disparity maps can be used in an equivalent manner to the above-mentioned depth maps. Disparity refers to the apparent shift of objects in a scene when observed from two different viewpoints, such as from the left-eye and the right-eye viewpoint. Disparity information and depth information are related and can be mapped onto one another provided the geometry of the respective viewpoints of the disparity map. In view of this close relationship and the fact that one can be transformed into the other, the term "depth map" and "depth values" used throughout the description are understood to comprise depth information as well as disparity information. That is to say, depth and disparity can be used interchangeably in the methods described below.

Herein, 'occlusion' is defined as a foreground object in an image overlying at least a portion of the background such that the background is not visible. Further, herein 'disocclusion' is defined as areas of an image no longer being occluded by a foreground object when the position of the foreground object is moved from its original position within the image according to a shift in viewpoint or perspective.

Further, as used herein, the articles 'a' and 'an' are intended to have their ordinary meaning in the patent arts, namely 'one or more'. For example, 'an image' means one or more 'image' and as such, 'the image' means 'image(s)' herein. Also, any reference herein to 'top', 'bottom', 'upper', 'lower', 'up', 'down', 'front', back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 1B:
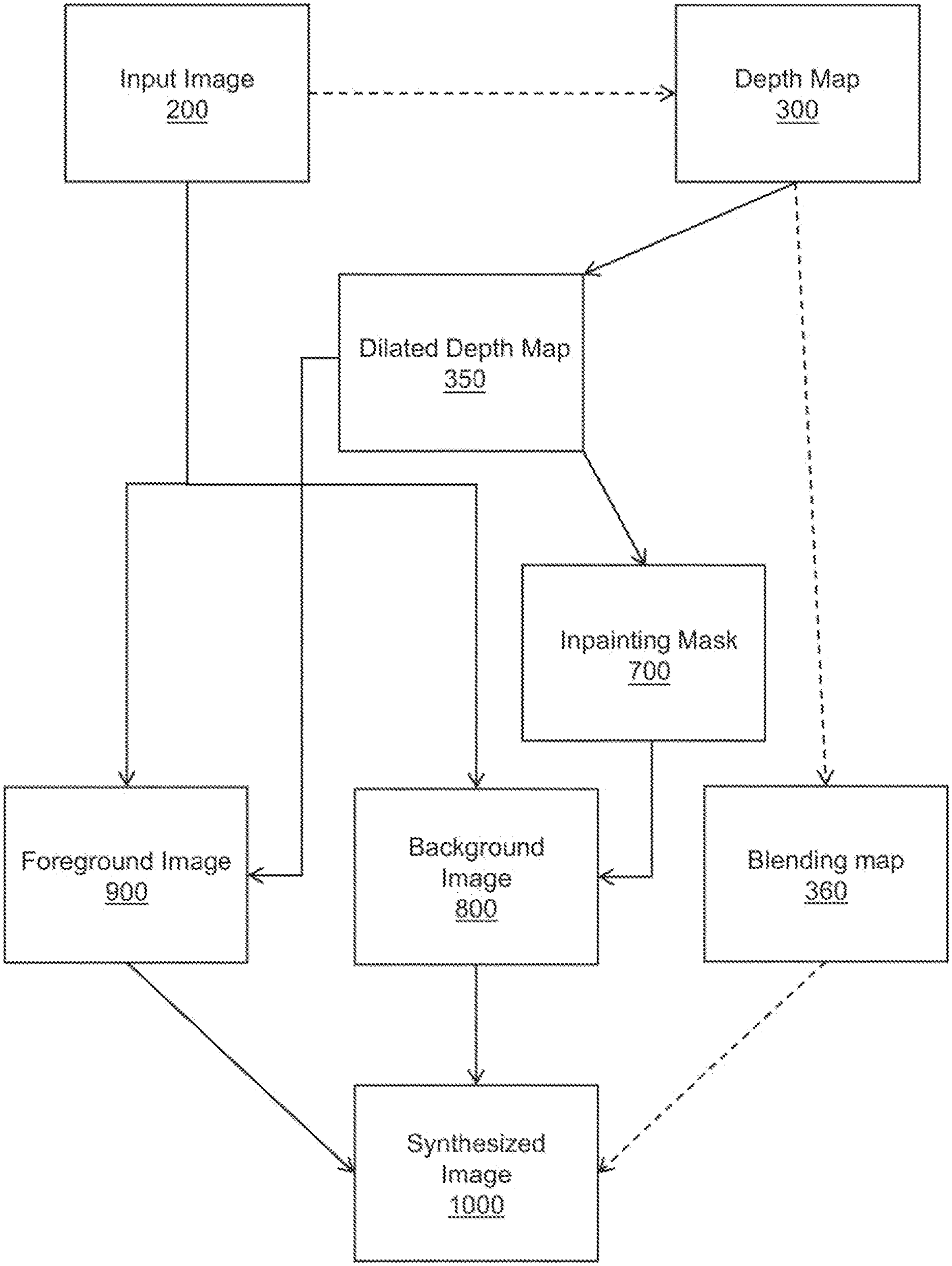
FIG. 1*b* illustrates the inter-relationship between different data objects used in the method of computer-implemented synthesized view image generation of FIG. 1.

According to some embodiments of the principles described herein, a method of computer-implemented synthesized view image generation is provided. FIG. 1*a* illustrates a flow chart of the steps of a method 100. Reference is also made to FIG. 1*b*, which depicts the relationship between different data objects used and generated in the present method. The steps of method 100 (which will each be described in more detail below) are as follows.

First, in step 101, an input image 200 comprising a plurality of pixels having color values is received. Then, in step 103 a dilated depth map 350 is generated by dilating a depth map 300 associated with the input image, the depth map comprising depth values respectively associated with each pixel in the input image. The depth map 300 may be generated from the input image 200, as indicated by optional step 102 in FIG. 1*a*, and by the dashed arrow connecting input image 200 and depth map 300 in FIG. 1*b*. In some embodiments, in optional step 104, a blending map 360 is generated from the depth map 300, the blending map 360 comprising blending values respectively associated with each pixel in the depth map 300. In step 105, the dilated depth map 350 is used to determine an inpainting mask 700. Next, in step 106, an inpainting operation is performed based on the inpainting mask and the input image to generate a background image 800. In step 107, a synthesized view image 1000 is rendered using the background image 800, the input image 200, and the dilated depth map 350. The rendering of the synthesized view image 1000 may comprise using the input image 200 and the dilated depth map 350 to generate a foreground image 900, which is combined with the background image 800, as illustrated in FIG. 1*b*. In embodiments where a blending map 360 has been generated, the blending map 360 can also be used in rendering the synthesized view image 1000.

Put another way, in the method described herein, depth estimation may be performed based on a single input image. Then an inpainting mask may be formed, wherein the inpainting mask highlights the areas need to be inpainted in order to later fill disocclusions. Then, the depth map is dilated and blending values are determined. Next, to render the synthesized view image, the foreground is rendered and the inpainted background image is rendered. Then, disocclusion holes in the foreground image are filled using the background image, such that the synthesized view image is rendered.

The method will now be explained in more detail, taking the steps of the method shown in FIG. 1*a* in turn.

First, at step 101 in FIG. 1*a*, an input image 200 is received. The input image 200 may be a 2D RGB image. That is to say, for each pixel in the input image 200, color values (e.g., Red, Green and Blue) are assigned. The input image 200 may be received from any number of sources. For example, the input image 200 may be captured by a 2D still camera. The input image 200 may be a single frame of a 2D video. The image 200 may be a generated image, for example an image generated by a deep learning model or generative AI (such as OpenAI's DALL-E model, or such like).

Figure 2:
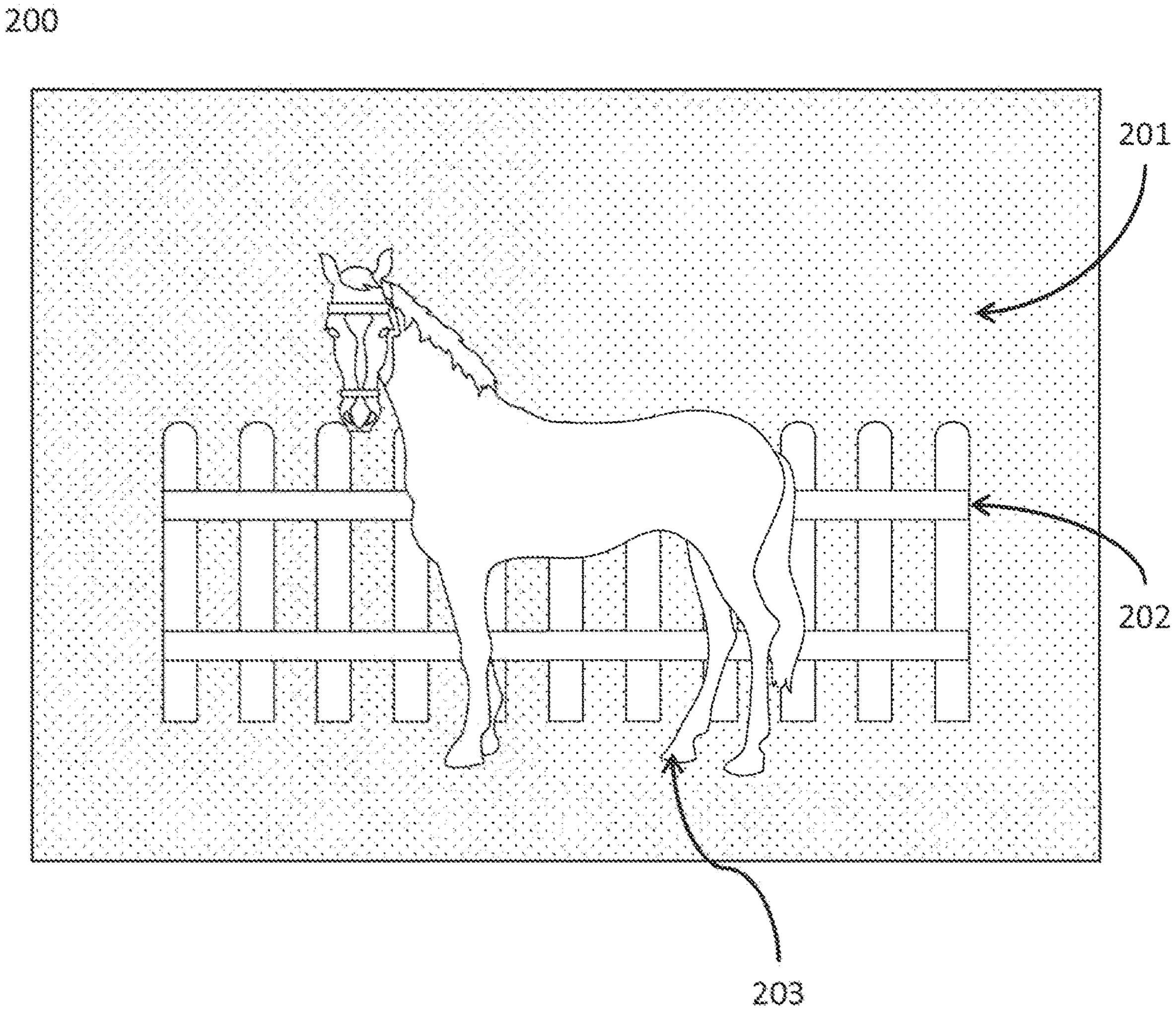
FIG. 2 illustrates an example input image, consistent with the principles described herein.

To facilitate discussion of the method, an exemplary input image 200 is shown in FIG. 2. The image comprises a background 201, and foreground objects 202 and 203. In this exemplary image, foreground object 203 is in front of foreground object 202 which is in turn in front of background 201.

As indicated by optional step 102 in FIG. 1*a*, after receiving the input image 200, a depth estimation may be performed on the image in order to generate a depth map 300. Monocular depth estimation techniques are able to estimate dense depth based on a single 2D (RGB) image. Many methods directly utilize a single image or estimate an intermediate 3D representation such as point clouds. Some other methods combine the 2D image with, for example, sparse depth maps or normal maps to estimate dense depth maps. These methods are trained on large scale datasets generated comprising RGB-D images, that is images where for each pixel color (RGB) values and a depth (D) value are provided. One depth estimation technique which is suitable for the present method is the Midas technique disclosed in Ranftl et al "Towards robust monocular depth estimation: Mixing datasets for zero-shot cross-dataset transfer" *IEEE transactions on pattern analysis and machine intelligence,* 2020, which is incorporated by reference herein. The depth estimation technique may provide a depth value for each pixel within the input image, such that the depth map 300 comprises depth values associated with each pixel in the input image, each depth value being an estimation of the depth associated with the object at that pixel in the image.

It will of course be appreciated that the depth map 300 might not be generated from the received input image, but instead be provided by other means. For example, a depth map 300 may be captured at the time of capture of the input image using a depth sensor (such as a time-of-flight sensor or the like). By way of further example, a depth map 300 might be generated by a different application or by an operating system, at the point of capture of the input image or later. In either case, the depth map 300 may be received alongside the input image.

Figure 3:
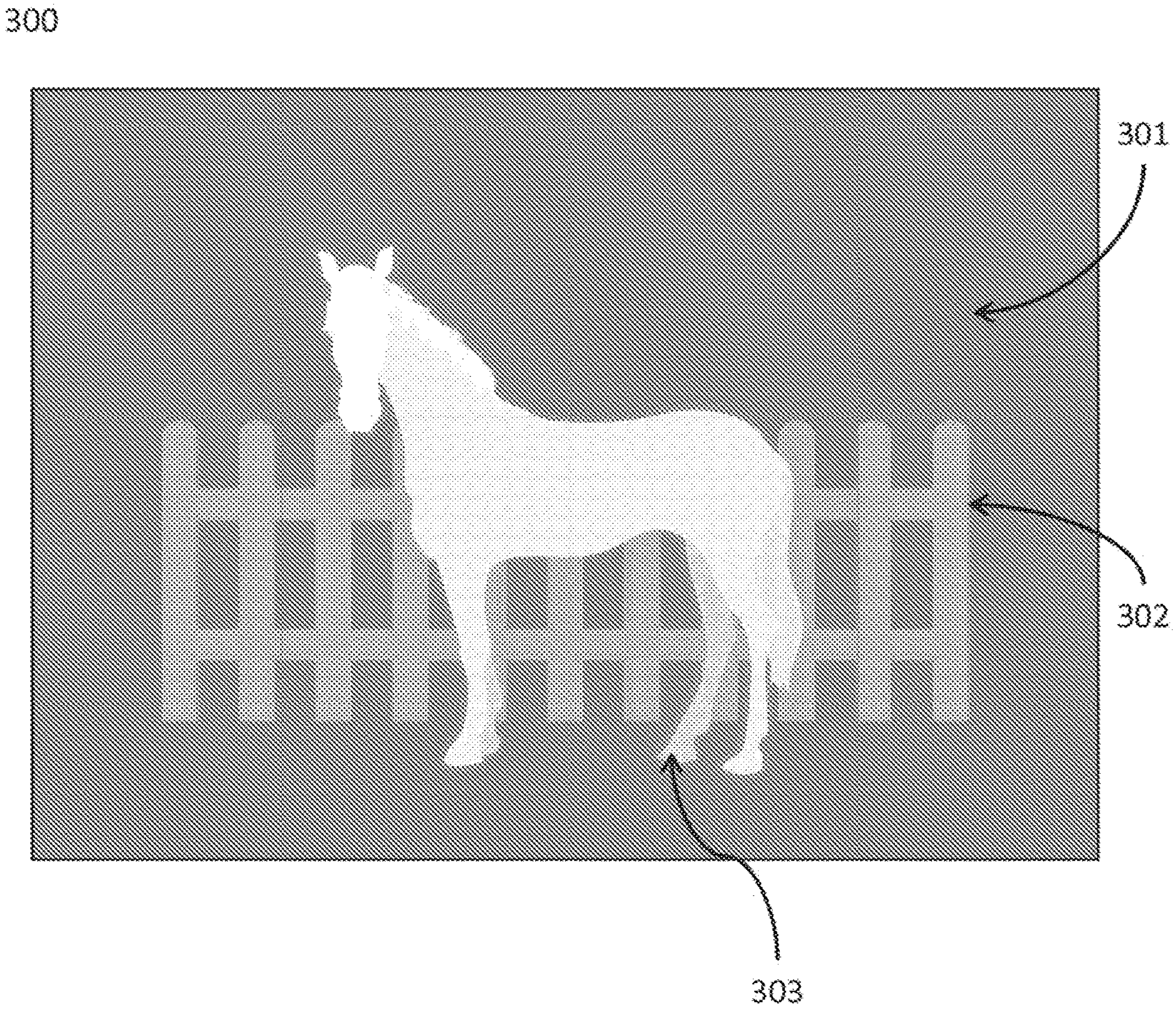
FIG. 3 illustrates an example depth map, consistent with the principles described herein.

To facilitate discussion of the method, an exemplary depth map 300 is shown in FIG. 3, where the shading of each pixel in depth map 300 represents a depth value (i.e., estimated depth) of each corresponding pixel in input image 200, with darker shades indicating greater depth values (i.e., at a position further into the imaged scene from the 'viewer'), and lighter shades indicating smaller depth values (i.e., at a position nearer to the 'viewer'). In this case, area 301 of the depth map 300 corresponds to the background, area 302 corresponds to foreground object 202 and area 303 corresponds to foreground object 203.

Figure 4A:
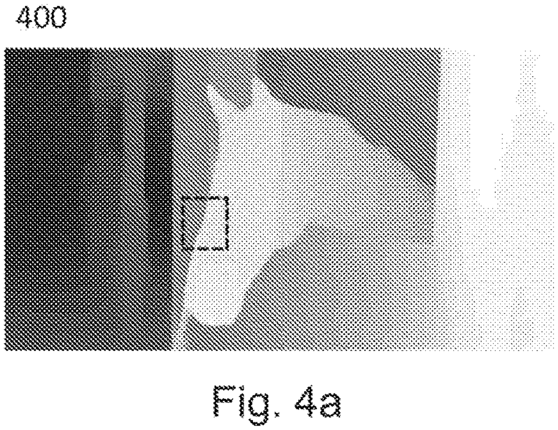
FIG. 4*a* illustrates another example depth map, consistent with the principles described herein.
Figure 4B:
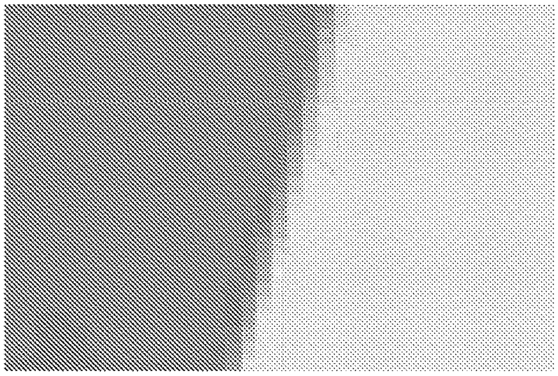
FIG. 4*b* illustrates a zoomed in portion of the depth map of FIG. 4*a*.

Generally, the depth values in a depth map will not have a sharp (or step-like) transition from the foreground to the background depth. Instead, there will be transitional depth values visible near the edges of an object. This is illustrated in FIGS. 4*a* and 4*b*. FIG. 4*a* shows another exemplary depth map 400, and FIG. 4*b* is a zoomed in part of the depth map 400 corresponding to the dashed rectangle in FIG. 4*a*. As can be seen in FIG. 4*b*, between the lightest shaded area (right hand side of the image, corresponding to a foreground object) and the darkest shaded area (left hand side of the image, corresponding to a background area of the image), there are pixels with transitional depth values, that is, pixels with depth values falling between that of the foreground object and the background area. The inventors of the present invention have identified that these foreground-background transitions can give rise to visual artefacts when rendering novel views in synthesized images using forward or backward mapping.

Figure 6:
FIG. 6 illustrates an image, not derived by a method in accordance with embodiments disclosed herein, in which striping artefacts are visible.

For example, when using forward mapping, a striping artifact can arise due to the transitional depth values. This is because each transitional depth values give rise to a slightly further displacement of the associated pixel of the foreground object, spread across the disoccluded area. Additionally, the edge of the foreground object is damaged as some of the pixels near the edge may be displaced away from the rest of the object. An example of this striping artefact is illustrated in FIG. 6, which shows a forward mapped rendering of a foreground image (without inpainting of the disoccluded regions). As can be seen, 'stripes' of pixels can be seen in the disoccluded area near the foreground object.

In the present method, after the depth map 300 has been either received with the input image or generated from the input image, at step 103, a dilated depth map 350 is generated from the image. Generating a dilated depth map may provide sharp transitions between areas of different depth values.

In general terms, the process of generating the dilated depth map 350 from the depth map 300 is to convert graded transitions between foreground areas and background areas in the depth map 300 into sharp transitions in the dilated depth map 350.

In some embodiments, the process for generating the dilated depth map 350 is as follows.

A local minimum depth value, and a local maximum depth value are identified. Transitional depth values are also identified, each transitional depth value having a value that is between the local minimum depth value and the local maximum depth value. For pixels in the depth map 300 having transitional depth values, the depth value of the corresponding pixels in the dilated depth map 350 are set to the local maximum depth value.

In some embodiments, this is only performed when the difference between the local maximum depth value and the local minimum depth value exceeds a certain threshold difference in depth. That is to say, where the transitional depth values fall within a small range of depth values (defined by a threshold difference in depth values), then the pixels in the dilated depth map corresponding to pixels in the depth map having transitional depth values are not set to the local maximum value, but instead are set to the transitional depth values of the corresponding pixels in the depth map 300. This may help to limit the computational demand of the method.

For pixels in the depth map 300 having the local minimum or local maximum depth value, the corresponding pixels in the dilated depth map 350 are respectively set to the local minimum and local maximum depth values.

The above process may be applied iteratively over a plurality of areas within the image.

Figure 5A:
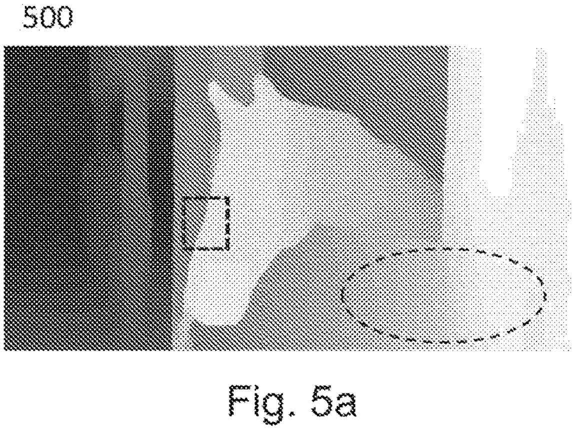
FIG. 5*a* illustrates an example dilated depth map, corresponding to the depth map of FIG. 4*a*.
Figure 5B:
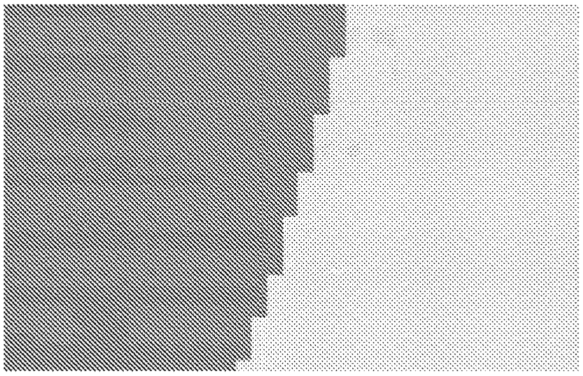
FIG. 5*b* illustrates a zoomed in portion of the dilated depth map of FIG. 5*a*.

An exemplary dilated depth map is illustrated in FIGS. 5*a* and 5*b*. FIG. 5*a* shows a dilated depth map 500 corresponding to the depth map 400. FIG. 5*b* is a zoomed in part of the depth map 500 corresponding to the dashed rectangle in FIG. 5*a*. As can be seen by comparing FIG. 5*b* to FIG. 4*b*, a sharp transition between the foreground object and the background area has been provided in the dilated depth map. It can also be seen by comparing FIG. 5*a* to FIG. 4*a* that for areas of the image with more gradual transition in depth values that that gradual transition is maintained between the depth map 400 and the dilated depth map 500 (for example in the area indicated by the dashed ellipse in FIG. 5*a*).

In some embodiments of the present method, at optional step 104, a blending map 360 is generated from the depth map 300. The blending map will be used to blend a transition between foreground and background areas in the synthesized view image 1000 which is ultimately rendered. The use of a blending map 360 may mitigate or even avoid entirely any dilation artefacts which may otherwise be visible after rendering. The blending map 360 comprises blending values for each pixel in the input image. The blending map 360 may be used as an alpha mask in rendering the synthesized view image at step 107. As such, the blending map will divide the image into three regions: a background region (corresponding to a minimum blending value, e.g., $\alpha=0.0$), a foreground region (corresponding to a maximum blending value, e.g., $\alpha=1.0$), and a transitional region (corresponding to blending values between the maximum blending value and the minimum blending value, e.g., $0.0<\alpha<1.0$). When rendering the synthesized view image, the blending map 360 may be applied as an alpha mask to smooth the transition between the foreground and background layers, with the blending value determining the opacity of the foreground pixel overlaying the background layer. For example, foreground pixels corresponding to a blending value, $\alpha=0.0$ may be fully transparent (i.e., for that pixel in the rendered image, only color information from the background layer is used), and foreground pixels corresponding to a blending value, $\alpha=1.0$ may be opaque (i.e., for that pixel in the rendered image, only color information from the foreground layer is used). For pixels corresponding to intermediate blending values, $0.0<\alpha<1.0$, the foreground pixel will be partially transparent (i.e., for that pixel in the rendered image, the color information will for each RGB channel take a value of the corresponding channel value in the foreground pixel multiplied by a added to the value of the corresponding channel in the background pixel multiplied by $(1-\alpha)$).

The blending map 360 may be generated by determining a local minimum depth value, a local maximum depth value and transitional depth values, each transitional depth value having a value that is between the local minimum depth value and the local maximum depth value. The blending value of each corresponding pixel in the blending map is set by scaling the depth values such that the local maximum depth value is scaled to a global maximum blending value (e.g., $\alpha=1.0$), the local minimum depth value is scaled to a global minimum blending value (e.g., $\alpha=0.0$). The transitional depth values are scaled to values between the global maximum blending value and the global minimum blending value, (e.g., $0.0<\alpha<1.0$). This process may be iterated over a plurality of areas within the image.

In the present method, at step 105, an inpainting mask 700 is determined from the dilated depth map 350. The inpainting mask 700 identifies areas of the input image 200 which may become disoccluded when a transformation is applied corresponding to a shift in perspective view. The inpainting mask 700 comprises, for each pixel in the input image 200, a value indicating whether that pixel will be inpainted in the inpainting operation. Put another way, these are areas in the image which may become disoccluded in a foreground image as foreground objects are moved according to a shift in perspective view. The inpainting mask 700 identifies areas of the input image which will be inpainted to provide a background image.

In some embodiments, the inpainting mask 700 may be generated by identifying depth transitions in the dilated depth mask 350 which exceed a threshold difference in depth; and adding one or more pixels to the inpainting mask 700, the one or more added pixels corresponding to the pixels of the dilated depth mask 350 adjacent to the transition and on the side of the transition having a lower depth value. That is to say, where sharp transitions in depth are identified in the dilated depth map 350, pixels are added to the inpainting mask 700 adjacent to the position of that transition on the less deep side of the transition. The threshold difference in depths which is used in this step may be the same threshold difference in depth which is used in generating the dilated depth map at step 103 or may be a different threshold difference in depth.

In some embodiments, only transitions in one (horizontal or vertical) direction are identified, and the one or more added pixels are respectively in the horizontal or vertical direction relative to the transition. This can be implemented where only horizontal or vertical parallax will be provided from the synthesized view image 1000, (that is to say, where the shift in perspective view will only be in the horizontal or vertical direction) because only areas of the image adjacent depth transitions in the direction of the perspective shift will potentially be disoccluded.

Put another way, for generating horizontally spacedviews, the process iterates over the dilated depth map, whenever a sudden increase of decrease is reached, the pixels horizontally positioned on the higher side (i.e., the side with lower depth values) of this transition are masked.

Figure 7:
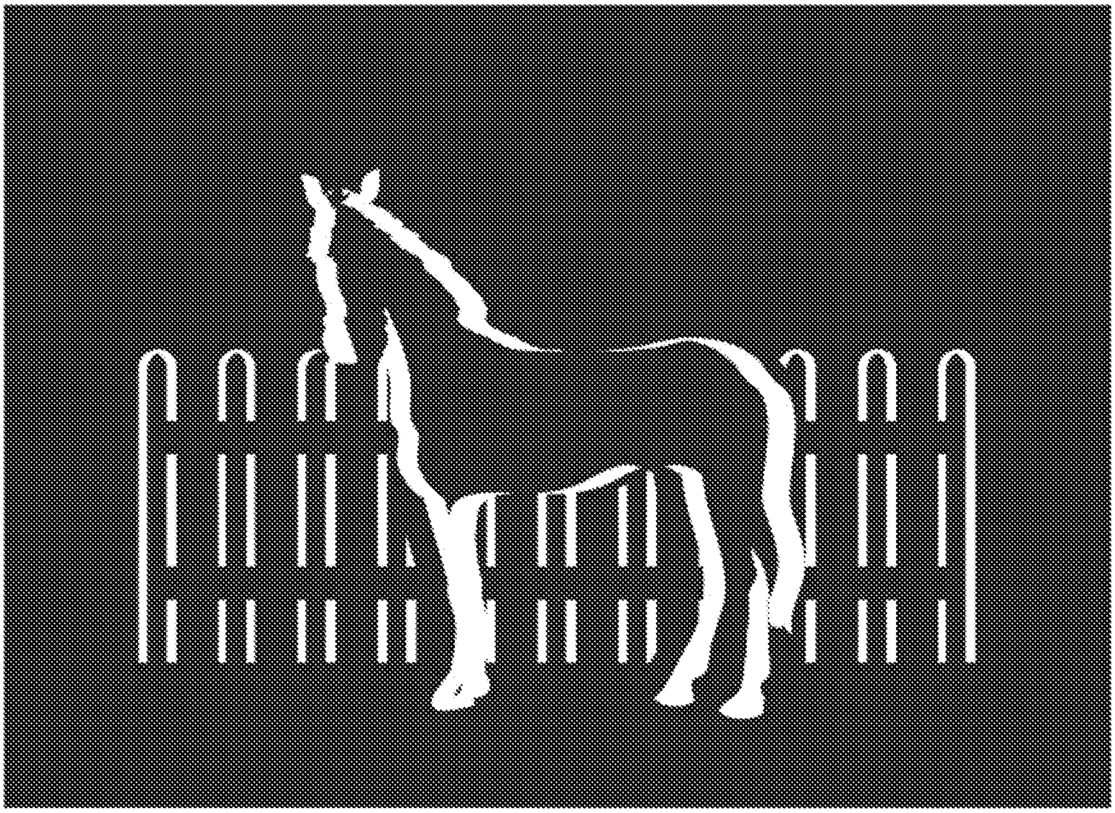
FIG. 7 illustrates an example inpainting mask, consistent with the principles described herein.

To facilitate discussion of the method, an exemplary inpainting mask 700 is shown in FIG. 7, derived from the depth map 300. White areas in the inpainting mask 700 indicate areas which are to be inpainted in an inpainting operation. In this example, only horizontal depth transitions in depth map 300 have been identified to add pixels to the inpainting mask.

After the inpainting mask has been generated, at step 106, an inpainting operation is performed to generate a background image 900. In some embodiments, this is achieved by providing the input image 200 and the inpainting mask 700 to an inpainting neural network.

In some embodiments, the inpainting network is a depth-aware inpainting network. By depth-aware inpainting, it is meant that both color values and depth values are generated for the areas of the background image which are inpainted. The input image 200 is provided as an RGB-d image (i.e., each pixel having RGB color information and a depth value D derived from the depth map 300 or from the dilated depth map 350). The inpainting network will inpaint the areas of the image defined by the inpainting mask to generate color (RGB) values and a depth value for each pixel in the inpainted area.

In some embodiments, the inpainting network is a generative adversarial network (GAN). A number of suitable inpainting networks may be employed. One such network is the LaMa inpainting network disclosed in Zhao et al. "Large scale image completion via co-modulated generative adversarial networks". *International Conference on Learning Representations* (*ICLR*), 2021, which is incorporated by reference herein.

The LaMa network may be modified for RGB-D inpainting and trained on a combination of random inpainting masks (i.e., masks comprising randomly generated mask areas) and disocclusion inpainting masks (i.e., masks which have been derived from the inpainting mask generation process described above). The use of random inpainting masks (in addition to disocclusion inpainting masks) allows for better training of general inpainting which allows the network to handle larger masks that may occur on multilevel disocclusions.

In some embodiments, a second inpainting operation, different to the first inpainting operation, is used where the first inpainting operation generates pixels with depth values which, when compared to a reference depth value which is derived from the dilated depth map 350, indicate the presence of multilevel disocclusion. Alternatively, in some other embodiments the reference depth value can be derived from the depth map 300.

In some embodiments, for example, the reference depth value is the depth value of the pixel on the deeper side of the transition (i.e., the side of the depth transition with a greater depth value). The depth value of a pixel generated in the inpainting operation may be compared to this reference value. Where the difference in depth value between the inpainted pixel and the reference depth value exceeds a certain threshold difference in depth value, then a multilevel disocclusion can be assumed, in which case a different inpainting operation can be used. For example, a simple reflection inpainting can be used as the second inpainting operation.

Figure 8:
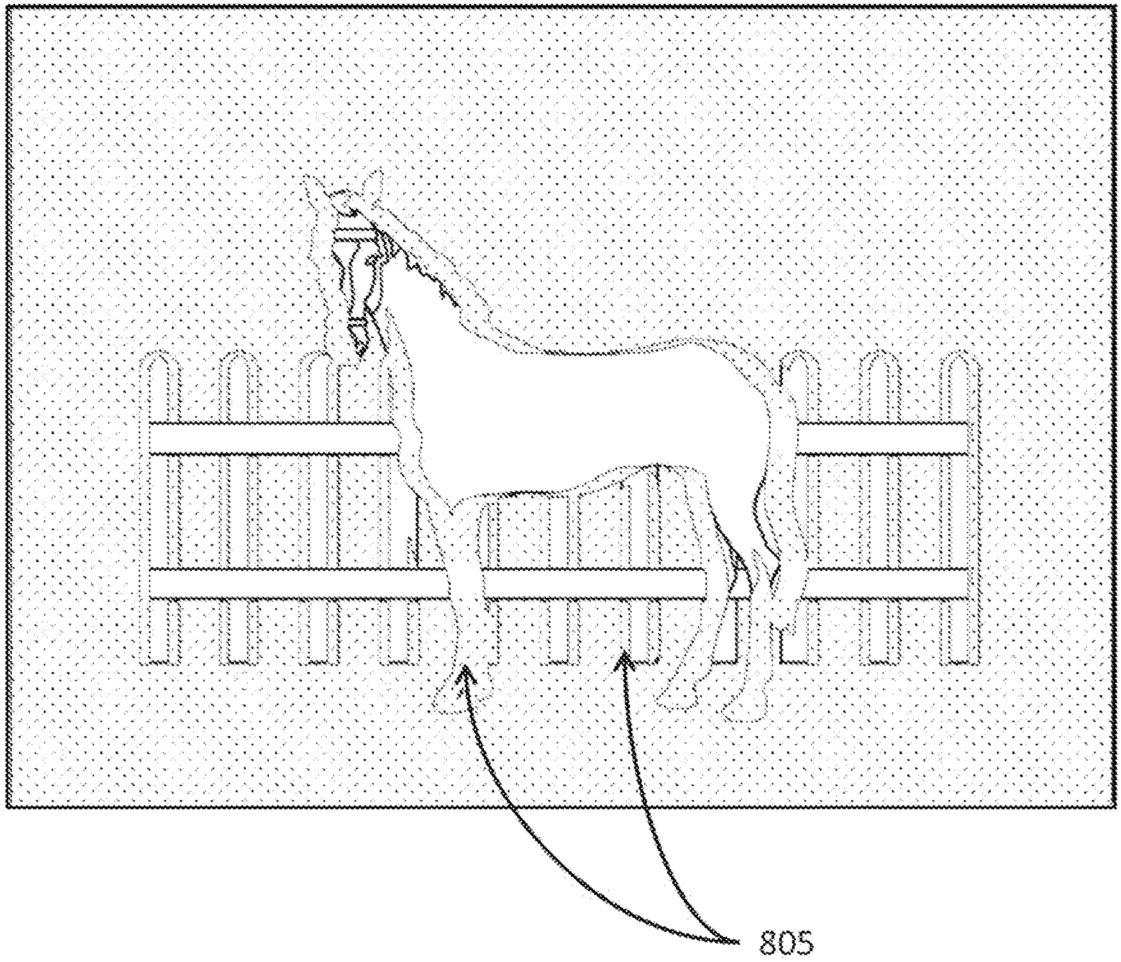
FIG. 8 illustrates an example background image, consistent with the principles described herein.

To facilitate discussion of the method, an exemplary background image 800 is shown in FIG. 8 and is the output of an inpainting operation using the inpainting mask 700 and input image 200. Areas 805 correspond to the areas identified in the inpainting mask which have been inpainted by the inpainting operation.

After the background image has been generated the process can proceed, at step 107, to render a synthesized view image 1000 that corresponds to an image having a different viewpoint than the input image. A transformation may be applied to the input image 200 using the depth values from the dilated depth map 350 in order to generate a foreground image 900. This may be achieved by, for each pixel in the input image 200, calculating a shift in position within the image for that pixel which will arise due to the change in position of the viewpoint and the depth value for that pixel from the dilated depth map 350. Each pixel is shifted according to the change in position calculated from the depth value in the depth map to generate the foreground image 900 (that is to say, color information from a pixel is transposed to another pixel according to the calculated change in position). This gives rise to a shift in position with groups of pixels corresponding to objects at foreground depths, according to the shift in position, and will also give rise to disocclusion holes consisting of areas of pixels which are disoccluded due to the difference in viewpoint between the foreground image and the input image.

Figure 9:
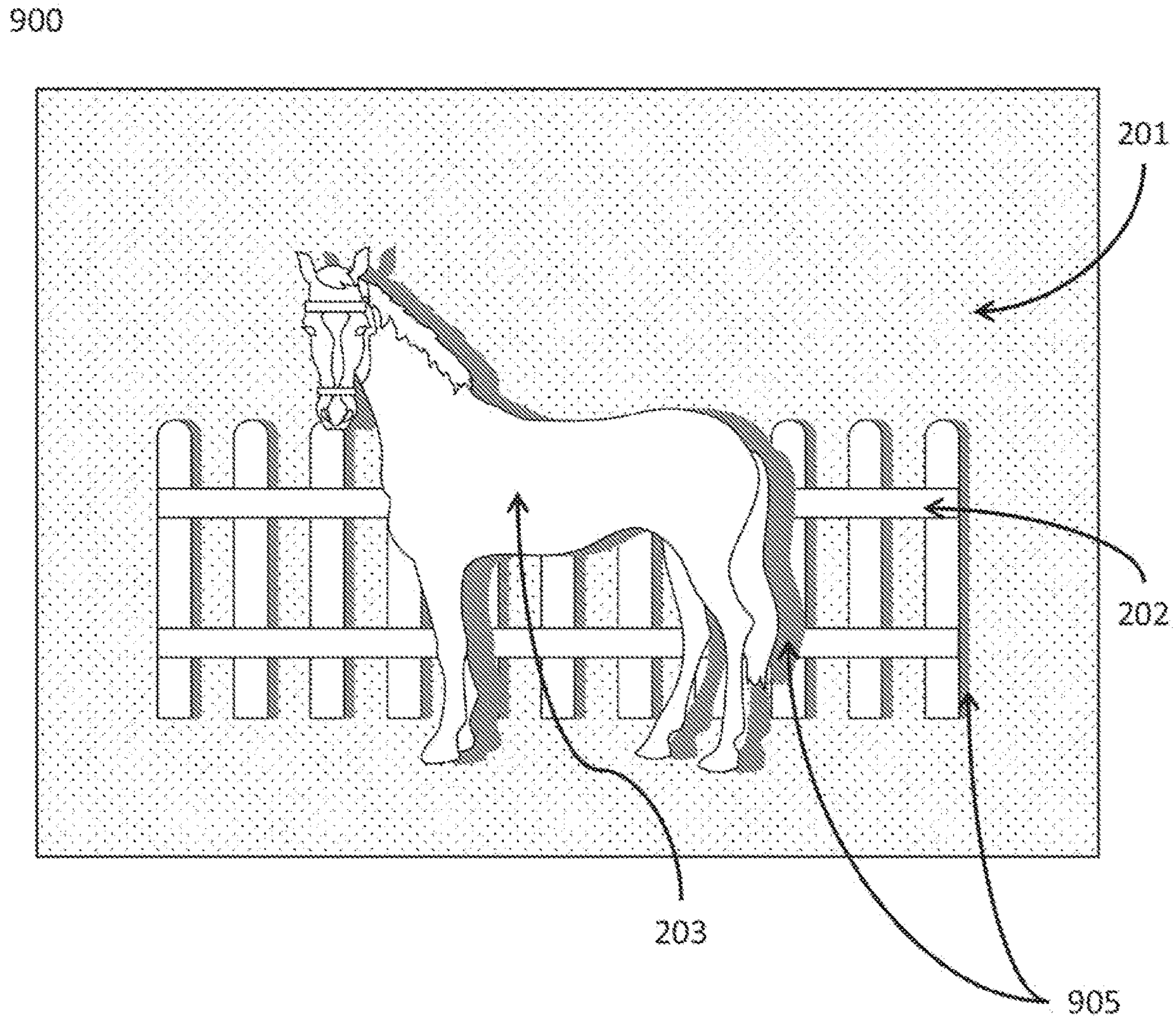
FIG. 9 illustrates an example foreground image, consistent with the principles described herein.

To facilitate discussion of the method, an exemplary foreground image 900 is shown in FIG. 9, corresponding to a transformation of the input image 200 of FIG. 2 using a dilated depth map derived from the depth map of FIG. 3. Foreground objects 202 and 203 have been shifted in position horizontally according to a change in viewpoint compared to the input image. The horizontal shift in position of the pixels associated with this object between the input image 200 and the foreground image 800 corresponds to the depth value for those pixels in dilated depth map 350. As can be seen, disocclusion holes 905 (shown in dark grey) have been left in the image.

The disocclusion holes are filled using information from the background image 900, by filling the disocclusion holes in the foreground image with information from corresponding pixels of the background image. In some embodiments, before the disocclusion holes are filled from the background image, a transformation is applied to the background image based on the change in viewpoint from the input image (i.e., pixels are shifted according to the depth associated with that pixel in the depth map).

In embodiments where a blending map 360 has been generated, the blending map is used to smooth the transition between the areas of the image derived from the foreground image and the background image. The blending map is applied as an alpha mask, as was described above in the discussion of step 104.

In some embodiments, an inpainting operation can be performed to fill any holes left near the edges of the rendered synthesized view image 1000. Such holes may arise since neither the foreground nor the background image will be mapped to these areas. Because these holes are relatively small and near the edge of the image, reflection inpainting is used in these remaining areas. This inpainting method is computationally inexpensive and effective for this task.

Figure 10:
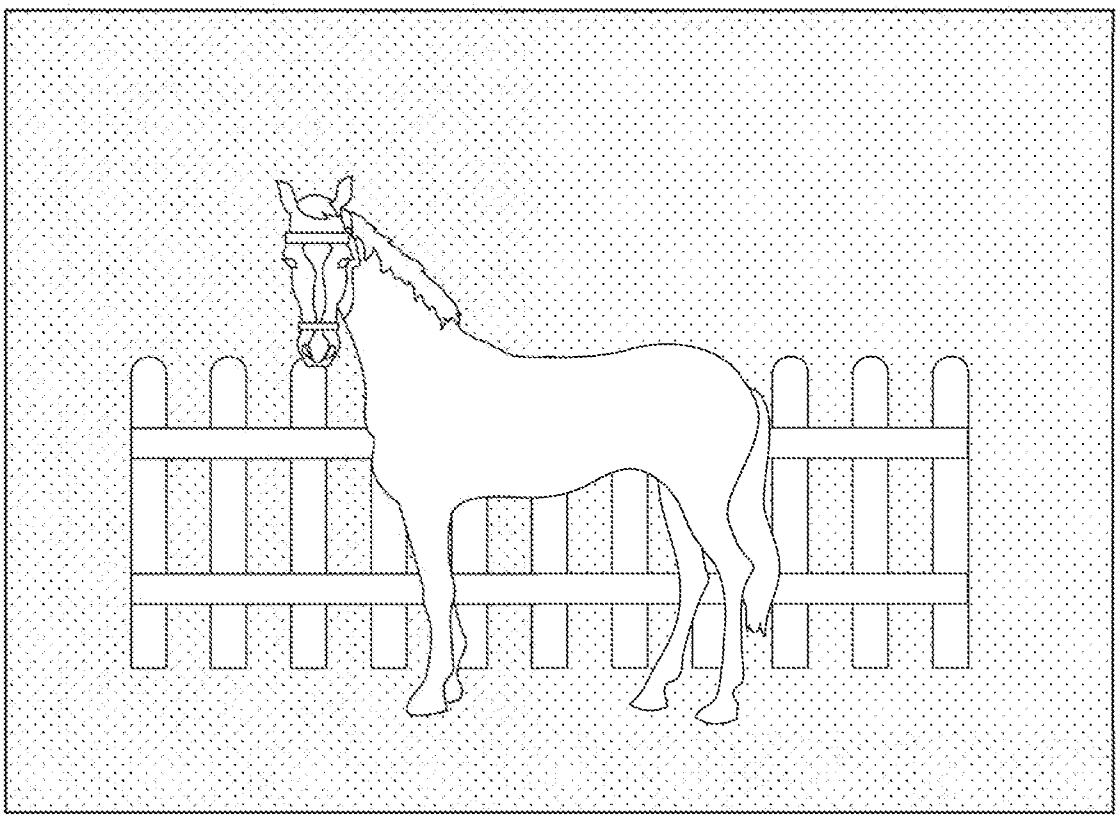
FIG. 10 illustrates an example synthesized view image, consistent with the principles described herein.

To facilitate discussion of the method, an exemplary synthesized view image 1000 is shown in FIG. 10, based on the foreground image 900 and background image 800. The disocclusion holes 905 have been filled using information from background image 800.

Once rendered, the synthesized view image 1000 may be displayed on a display screen. The synthesized view image may be displayed as part of a stereoscopic pair of images (on a stereoscopic display, a virtual reality headset or the like) with the input image or with another synthesized view image corresponding to the perspective view from a different viewpoint.

It will be appreciated that a number of synthesized view images can be provided, each corresponding to the perspective view from a different viewpoint. These may be displayed on a multiview display screen as a set of different views of a multiview image. The input image may or may not provide one of the views of the multiview image.

Figure 12:
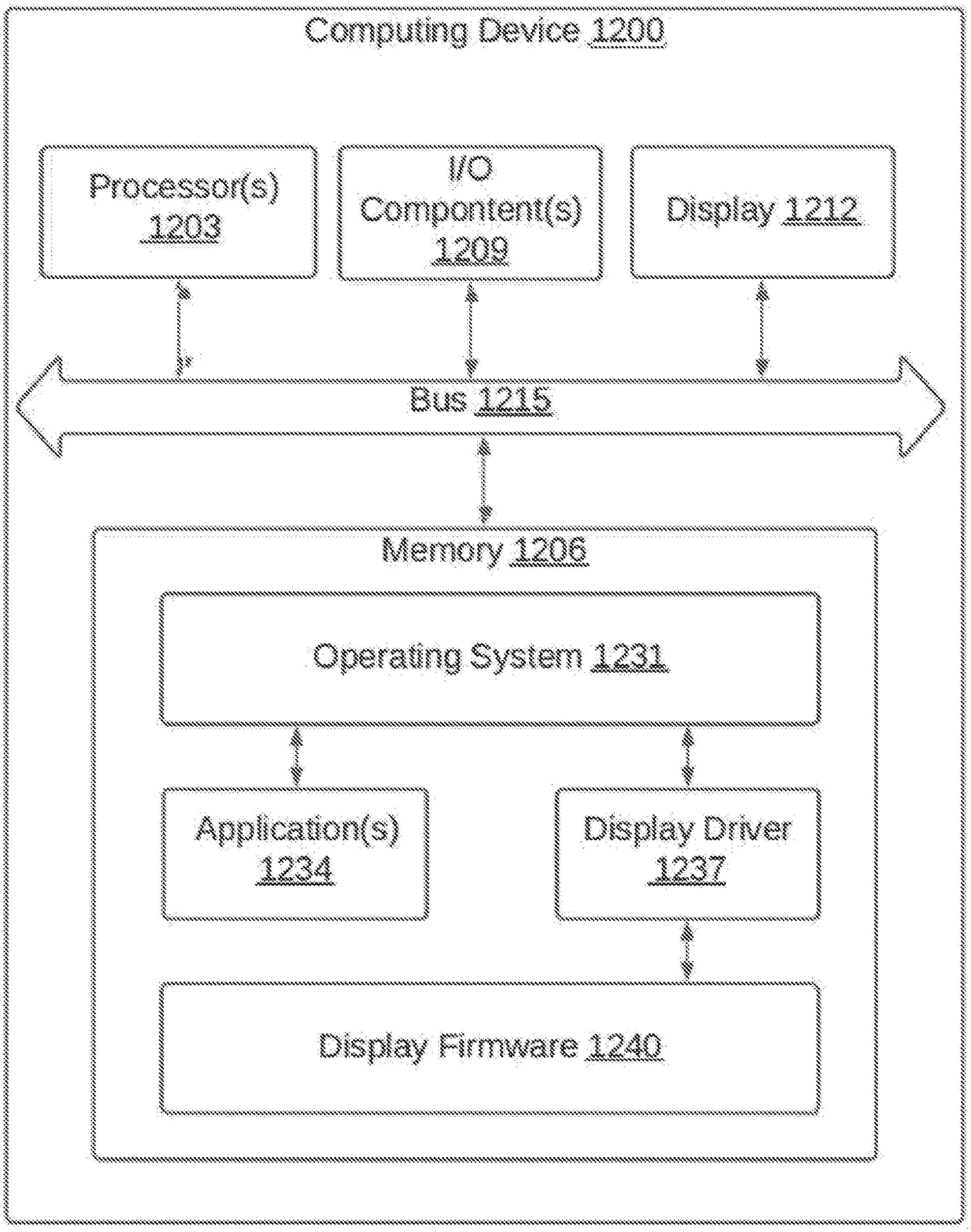
FIG. 12 illustrates a schematic block diagram that depicts one example illustration of a computing device which can be used to perform the method of computer-implemented synthesized view image generation, according to an embodiment consistent with the principles described herein.

FIG. 12 is a schematic block diagram that depicts an example illustration of a computing device 1200 providing a multiview display, according to various embodiments of the present disclosure. The computing device 1200 may include a system of components that carry out various computing operations for a user of the computing device 1200. The computing device 1200 may be a laptop, tablet, smart phone, touch screen system, intelligent display system, or other client device. The computing device 1200 may include various components such as, for example, a processor(s) 1203, a memory 1206, input/output (I/O) component(s) 1209, a display 1212, and potentially other components. These components may couple to a bus 1215 that serves as a local interface to allow the components of the computing device 1200 to communicate with each other. While the components of the computing device 1200 are shown to be contained within the computing device 1200, it should be appreciated that at least some of the components may couple to the computing device 1200 through an external connection. For example, components may externally plug into or otherwise connect with the computing device 1200 via external ports, sockets, plugs, or connectors.

A processor 1203 may be a central processing unit (CPU), graphics processing unit (GPU), or any other integrated circuit that performs computing processing operations. The processor(s) 1203 may include one or more processing cores. The processor(s) 1203 comprises circuitry that executes instructions. Instructions include, for example, computer code, programs, logic, or other machine-readable instructions that are received and executed by the processor(s) 1203 to carry out computing functionality that are embodied in the instructions. The processor(s) 1203 may execute instructions to operate on data. For example, the processor(s) 1203 may receive input data (e.g., an input image), process the input data according to an instruction set, and generate output data (e.g., a synthesized view image). As another example, the processor(s) 1203 may receive instructions and generate new instructions for subsequent execution.

The memory 1206 may include one or more memory components. The memory 1206 is defined herein as including either or both of volatile and nonvolatile memory. Volatile memory components are those that do not retain information upon loss of power. Volatile memory may include, for example, random access memory (RAM), static random access memory (SRAM), dynamic random access memory (DRAM), magnetic random access memory (MRAM), or other volatile memory structures. System memory (e.g., main memory, cache, etc.) may be implemented using volatile memory. System memory refers to fast memory that may temporarily store data or instructions for quick read and write access to assist the processor(s) 1203.

Nonvolatile memory components are those that retain information upon a loss of power. Nonvolatile memory includes read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive. The ROM may comprise, for example, a programmable read-only memory (PROM), an erasable programmable read-only memory (EPROM), an electrically erasable programmable read-only memory (EEPROM), or other like memory device. Storage memory may be implemented using nonvolatile memory to provide long term retention of data and instructions.

The memory 1206 may refer to the combination of volatile and nonvolatile memory used to store instructions as well as data. For example, data and instructions may be stored in nonvolatile memory and loaded into volatile memory for processing by the processor(s) 1203. The execution of instructions may include, for example, a compiled program that is translated into machine code in a format that can be loaded from nonvolatile memory into volatile memory and then run by the processor 1203, source code that is converted in suitable format such as object code that is capable of being loaded into volatile memory for execution by the processor 1203, or source code that is interpreted by another executable program to generate instructions in volatile memory and executed by the processor 1203, etc. Instructions may be stored or loaded in any portion or component of the memory 1206 including, for example, RAM, ROM, system memory, storage, or any combination thereof.

While the memory 1206 is shown as being separate from other components of the computing device 1200, it should be appreciated that the memory 1206 may be embedded or otherwise integrated, at least partially, into one or more components. For example, the processor(s) 1203 may include onboard memory registers or cache to perform processing operations.

I/O component(s) 1209 include, for example, touch screens, speakers, microphones, buttons, switches, dials, camera, sensors, accelerometers, or other components that receive user input or generate output directed to the user. I/O component(s) 1209 may receive user input and convert it into data for storage in the memory 1206 or for processing by the processor(s) 1203. I/O component(s) 1209 may receive data outputted by the memory 1206 or processor(s) 1203 and convert them into a format that is perceived by the user (e.g., sound, tactile responses, visual information, etc.).

A specific type of I/O component 1209 is a display 1212. The display 1212 may include a multiview display, a multiview display combined with a 2D display, or any other display that presents images. A capacitive touch screen layer serving as an I/O component 1209 may be layered within the display to allow a user to provide input while contemporaneously perceiving visual output. The processor(s) 1203 may generate data that is formatted as an image for presentation on the display 1212. The processor(s) 1203 may execute instructions to render the image on the display for perception by the user.

The bus 1215 facilitates communication of instructions and data between the processor(s) 1203, the memory 1206, the I/O component(s) 1209, the display 1212, and any other components of the computing device 1200. The bus 1215 may include address translators, address decoders, fabric, conductive traces, conductive wires, ports, plugs, sockets, and other connectors to allow for the communication of data and instructions.

The instructions within the memory 1206 may be embodied in various forms in a manner that implements at least a portion of the software stack. For example, the instructions may be embodied as an operating system 1231, an application(s) 1234, a device driver (e.g., a display driver 1237), firmware (e.g., display firmware 1240), or other software components. The operating system 1231 is a software platform that supports the basic functions of the computing device 1200, such as scheduling tasks, controlling I/O components 1209, providing access to hardware resources, managing power, and supporting applications 1234.

An application(s) 1234 executes on the operating system 1231 and may gain access to hardware resources of the computing device 1200 via the operating system 1231. In this respect, the execution of the application(s) 1234 is controlled, at least in part, by the operating system 1231. The application(s) 1234 may be a user-level software program that provides high-level functions, services, and other functionality to the user. In some embodiments, an application 1234 may be a dedicated 'app' downloadable or otherwise accessible to the user on the computing device 1200. The user may launch the application(s) 1234 via a user interface provided by the operating system 1231. The application(s) 1234 may be developed by developers and defined in various source code formats. The applications 1234 may be developed using a number of programming or scripting languages such as, for example, C, C++, C#, Objective C, Java®, Swift, JavaScript®, Perl, PHP, Visual Basic®, Python®, Ruby, Go, or other programming languages. The application(s) 1234 may be compiled by a compiler into object code or interpreted by an interpreter for execution by the processor(s) 1203.

Device drivers such as, for example, the display driver 1237, include instructions that allow the operating system 1231 to communicate with various I/O components 1209. Each I/O component 1209 may have its own device driver. Device drivers may be installed such that they are stored in storage and loaded into system memory. For example, upon installation, a display driver 1237 translates a high-level display instruction received from the operating system 1231 into lower level instructions implemented by the display 1212 to display an image.

Firmware, such as, for example, display firmware 1240, may include machine code or assembly code that allows an I/O component 1209 or display 1212 to perform low-level operations. Firmware may convert electrical signals of particular component into higher level instructions or data. For example, display firmware 1240 may control how a display 1212 activates individual pixels at a low level by adjusting voltage or current signals. Firmware may be stored in nonvolatile memory and executed directly from nonvolatile memory. For example, the display firmware 1240 may be embodied in a ROM chip coupled to the display 1212 such that the ROM chip is separate from other storage and system memory of the computing device 1200. The display 1212 may include processing circuitry for executing the display firmware 1240.

The operating system 1231, application(s) 1234, drivers (e.g., display driver 1237), firmware (e.g., display firmware 1240), and potentially other instruction sets may each comprise instructions that are executable by the processor(s) 1203 or other processing circuitry of the computing device 1200 to carry out the functionality and operations discussed above. Although the instructions described herein may be embodied in software or code executed by the processor(s) 1203 as discussed above, as an alternative, the instructions may also be embodied in dedicated hardware or a combination of software and dedicated hardware. For example, the functionality and operations carried out by the instructions discussed above may be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc.

In some embodiments, the instructions that carry out the functionality and operations discussed above may be embodied in a non-transitory, computer-readable storage medium. The computer-readable storage medium may or may not be part of the computing device 1200. The instructions may include, for example, statements, code, or declarations that can be fetched from the computer-readable medium and executed by processing circuitry (e.g., the processor(s) 1203). In the context of the present disclosure, a 'computer-readable medium' may be any medium that can contain, store, or maintain the instructions described herein for use by or in connection with an instruction execution system, such as, for example, the computing device 1200.

The computer-readable medium can comprise any one of many physical media such as, for example, magnetic, optical, or semiconductor media. More specific examples of a suitable computer-readable medium may include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

The computing device 1200 may perform any of the operations or implement the functionality descried above. For example, the flowchart and process flows discussed above may be performed by the computing device 1200 that executes instructions and processes data. While the computing device 1200 is shown as a single device, the present disclosure is not so limited. In some embodiments, the computing device 1200 may offload processing of instructions in a distributed manner such that a plurality of computing devices 1200 operate together to execute instructions that may be stored or loaded in a distributed arranged. For example, at least some instructions or data may be stored, loaded, or executed in a cloud-based system that operates in conjunction with the computing device 1200.

The present disclosure also provides computer program products corresponding to the each and every embodiment of the method of computer-implemented synthesized view image generation, described herein. Such computer program products comprise instructions which, when executed by a computer, cause the computer to implement any of the methods disclosed herein. The computer program product may be embodied in a non-transitory, computer-readable storage medium.

EXPERIMENTAL RESULTS

The present method of synthesized view image generation was compared to previously reported methods. In particular, a method including steps 101, 102, 103, 104, 105, 106 and 107 was compared to two previously reported methods, namely the SynSin method disclosed in Wiles et al., "SynSin: End-to-end view synthesis from a single image" *In Proceedings of the IEEE CVF Conference on Computer Vision and Pattern Recognition*, pp 7467-7477, 2020, and the Slide method disclosed in Jampani et al., "Slide: Single image 3*d* photography with soft layering and depth-aware inpainting", *In Proceedings of the IEEE CVF International Conference on Computer Vision*, pp. 12518-12527, 2021. The two previously reported methods and the present method were applied to the Holopix50k dataset, and a number of metrics were used to determine the effectiveness of each method. The Holopix50 dataset is disclosed in Hua et al., "Holopix50k: A large-scale in-the-wild stereo image dataset", *arXiv preprint arXiv:* 2003.11172, 2020.

The following four evaluation metrics were determined: 1. Mean squared error (MSE). 2. Peak signal-to-noise ratio (PSNR) 3. Structural similarity index measure (SSIM) 4. Learned perceptual image patch similarity (LPIPS). Details of these metrics are given in Zhang et al., "The unreasonable effectiveness of deep features as a perceptual metric", *CVPR,* 2018, which is incorporated by reference herein. The results are shown in Table 1.

TABLE 1

Evaluation of present method compared to the previously reported view synthesis methods and the standard completions on the Holopix50k dataset.

| Method | MSE ↓ | PSNR ↑ | SSIM ↑ | LPIPS [22] ↓ |
|---|---|---|---|---|
| SynSin | 1639.46 | 16.88 | 0.458 | 0.374 |
| Slide | 949.54 | 19.46 | 0.568 | 0.121 |
| Present method | 938.50 | 19.59 | 0.571 | 0.111 |

It can be seen from the results in Table 1 that the present method provides an improvement over the previously reported methods according to all four metrics.

Figure 11A:
FIGS. 11*a* to 11*c* illustrate rendered synthetic view images provided from different methods, including a method of computer-implemented synthesized view image generation consistent with the principles described herein.
Figure 11B:
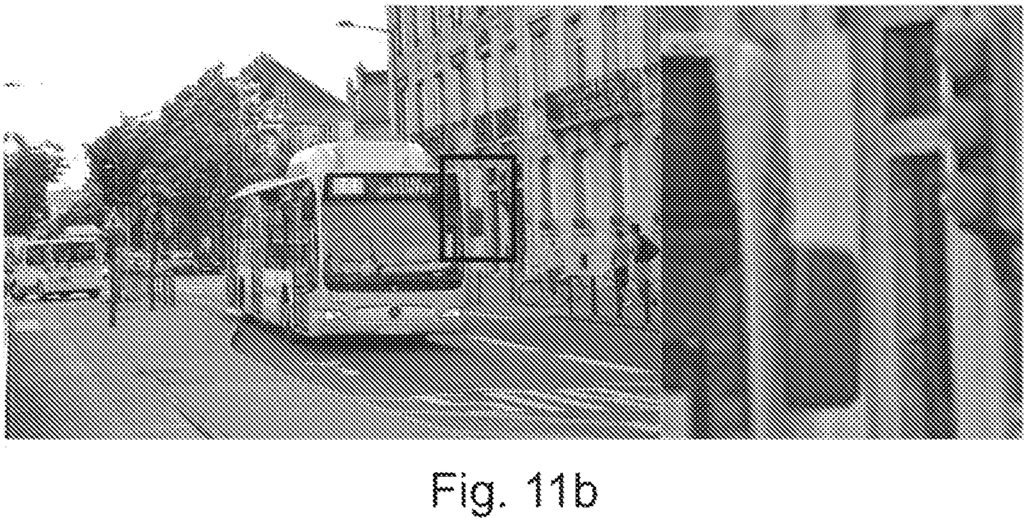
Figure 11C:
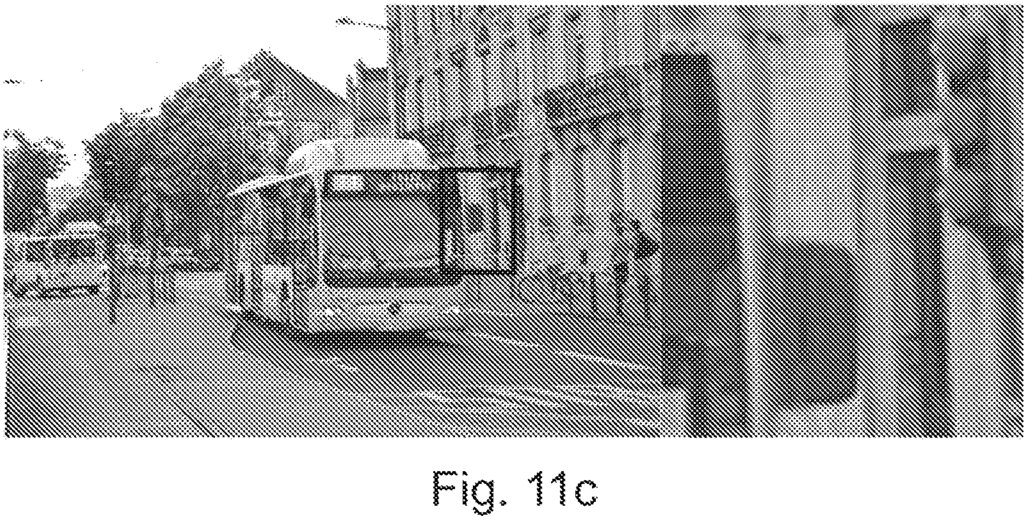

Improvements over the previously reported methods are also apparent from a qualitative analysis by a visual comparison of the rendering of synthesized view images from the different methods. FIGS. 11*a*-11*c* show the same rendered synthetic view image provided from different methods, with FIG. 11*a* showing an image produced by the SynSin method, FIG. 11*b* showing an image produced by the Slide method, and FIG. 11*c* showing an image produced by the present method. In each case, a zoomed in view of the area indicated by the solid rectangle is provided. From a comparison of the image of FIG. 11*c* with that of FIG. 11*a* it can be seen that the present method does not give rise to noticeable distortion, as is the case of the image produced by the SynSin method (see, for example, the distortion of the traffic lights indicated by the dashed rectangle in FIG. 11*a*). From a comparison of the zoomed in portion of FIG. 11*c* with that of FIG. 11*b* it can be seen that the image of the present method is free of the visual artefacts which arise from the Slide method. Accordingly, it will be appreciated that the present method provides an improvement over the two previously reported methods on both a qualitative and quantitative assessment.

Thus, there have been described examples and embodiments of a method and a system that provide layered view synthesis. The above-described examples are merely illustrative of some of the many specific examples that represent the principles described herein. Clearly, those skilled in the art may readily devise numerous other arrangements without departing from the scope as defined by the following claims.

What is claimed is:

1. A method of computer-implemented synthesized view image generation, the method comprising:

receiving an input image comprising a plurality of pixels having color values;

generating a dilated depth map by dilating a depth map associated with the input image, the depth map comprising depth values respectively associated with each pixel in the input image;

determining an inpainting mask using the dilated depth map;

performing an inpainting operation based on the inpainting mask and the input image to generate a background image; and rendering a synthesized view image using the background image, the input image, and the dilated depth map, wherein generating the dilated depth map comprises;

determining, within a local area of the depth map, a local minimum depth value, a local maximum depth value, and transitional depth values, each transitional depth value having a value that is between the local minimum depth value and the local maximum depth value; and setting depth values of pixels in a corresponding local area of the dilated depth map that correspond to pixels in the depth map having the transitional depth values to the local maximum depth value.

2. The method of computer-implemented synthesized view image generation of claim 1, further comprising:

generating the depth map of the input image by performing depth estimation within the input image to determine the depth values respectively associated with each pixel.

3. The method of computer-implemented synthesized view image generation of claim 1, wherein setting the depth values of the pixels in the dilated depth map is performed when a difference between the local minimum depth value and local maximum depth value of the depth map exceeds a predetermined threshold difference in depth value.

4. The method of computer-implemented synthesized view image generation of claim 1, further comprising:

generating a blending map from the depth map, the blending map comprising blending values respectively associated with each pixel in the depth map, and wherein the synthesized view image is rendered using the blending map;

wherein generating a blending map comprises:

determining a local minimum depth value, a local maximum depth value, and transitional depth values, each transitional depth value having a value that is between the local minimum depth value and the local maximum depth value; and setting the blending value of each corresponding pixel in the blending map based by scaling the depth values such that the local maximum depth value is scaled to a global maximum blending value, the local minimum depth value is scaled to a global minimum blending value;

wherein rendering the synthesized view image comprises:

generating a foreground image from the input image and the dilated depth map; and generating the synthesized view image by combining the foreground image with the background image, wherein generating the synthesized view image includes smoothing a transition between areas of the synthesized view image corresponding to the foreground image and areas of the synthesized view image corresponding to the background image according to the blending values in the blending map;

wherein the foreground image corresponds to an image having a difference in viewpoint from the input image, the foreground image having disocclusion holes consisting of sets of pixels corresponding to areas which are disoccluded due to the difference in viewpoint between the foreground image and the input image;

wherein combining the foreground image with the background image comprises:

filling the disocclusion holes in the foreground image with information from corresponding pixels of the background image;

wherein the background image comprises depth values associated with each pixel and filling the disocclusion holes in the foreground image comprises:

applying a transformation to the background image based on the difference in viewpoint;

wherein smoothing the transition between the areas of the synthesized view image comprises:

using the blending map as an alpha mask; and wherein the rendering of the synthesized view image further comprises:

performing an inpainting operation to fill holes left near edges of the synthesized view image, wherein said inpainting operation is a reflection inpainting operation.

5. The method of computer-implemented synthesized view image generation of claim 1, wherein determining the inpainting mask comprises:

identifying depth transitions in the dilated depth map which exceed a threshold difference in depth; and adding one or more pixels to the inpainting mask, the one or more added pixels corresponding to the pixels of the dilated depth map adjacent to the transition and on a side of the transition having a lower depth value; and wherein the identified depth transitions are transitions only in one of a horizontal or a vertical direction within the depth map, and wherein the one or more added pixels are respectively in the horizontal or vertical direction relative to the transition.

6. The method of computer-implemented synthesized view image generation of claim 1, wherein performing the inpainting operation comprises:

providing input image and the inpainting mask to an inpainting network, the inpainting network generating the background image, wherein the inpainting network is a depth-aware inpainting network; and wherein the inpainting network has been trained on data comprising:

a first set of data comprising images and associated respective disocclusion masks; and a second set of data comprising images and associated respective random inpainting masks.

7. The method of computer-implemented synthesized view image generation of claim 1, wherein performing the inpainting operation further comprises:

comparing the depth value generated for each inpainted pixel to the depth value of a reference depth value derived from the dilated depth map; and using a second inpainting operation to replace that pixel in the background image when a difference between the depth value generated for the inpainted pixel and the depth value of a corresponding pixel in the depth map exceeds a threshold difference in depth, wherein the second inpainting operation is a reflection inpainting operation.

8. The method of computer-implemented synthesized view image generation of claim 1, further comprising:

displaying the synthesized view image on a multiview display screen.

9. The method of computer-implemented synthesized view image generation of claim 1, wherein the inpainting mask comprises, for each pixel in the input image, a value indicating whether that pixel will be inpainted in the inpainting operation.

10. A non-transitory computer-readable storage medium storing a computer program product comprising instructions which, when the instructions are executed by a computer, cause the computer to implement synthesized view image generation by:

generating a dilated depth map by dilating a depth map associated with a received input image, the input image comprising a plurality of pixels having color values and the depth map comprising depth values respectively associated with each pixel in the input image;

determining an inpainting mask using the dilated depth map;

performing an inpainting operation based on the inpainting mask and the input image to generate a background image; and rendering a synthesized view image using the background image, the input image, and the dilated depth map, wherein generating the dilated depth map comprises:

determining, within a local area of the depth map, a local minimum depth value, a local maximum depth value, and transitional depth values, each transitional depth value having a value that is between the local minimum depth value and the local maximum depth value; and setting depth values of pixels in a corresponding local area of the dilated depth map that correspond to pixels in the depth map having the transitional depth values to the local maximum depth value.

11. The computer program product of claim 10, wherein the instructions, when the program is executed by a computer, cause the computer to implement synthesized view image generation further by:

generating the depth map of the input image by performing depth estimation within the image to determine the depth values respectively associated with each pixel.

12. The computer program product of claim 10, wherein setting the depth values of the pixels in the dilated depth map is performed when a difference between the local minimum depth value and local maximum depth value of the depth map exceeds a predetermined threshold difference in depth value.

13. The computer program product of claim 10, wherein the instructions, when the program is executed by a computer, cause the computer to implement synthesized view image generation further by:

generating a blending map from the depth map, the blending map comprising blending values respectively associated with each pixel in the depth map, and wherein the synthesized view image is rendered using the blending map.

14. A synthesized view image generation system, the system comprising:

a processor; and a memory that stores instructions which, when executed, cause the processor to:

generate a dilated depth map by dilating a depth map associated with a received input image, the input image comprising a plurality of pixels having color values and the depth map comprising depth values respectively associated with each pixel in the input image;

determine an inpainting mask using the dilated depth map, perform an inpainting operation based on the inpainting mask and the input image to generate a background image; and render a synthesized view image using the background image, the input image, and the dilated depth map, wherein generating the dilated depth map comprises:

determining, within a local area of the depth map, a local minimum depth value, a local maximum depth value, and transitional depth values, each transitional depth value having a value that is between the local minimum depth value and the local maximum depth value; and setting depth values of pixels in a corresponding local area of the dilated depth map that correspond to pixels in the depth map having the transitional depth values to the local maximum depth value.

15. The synthesized view image generation system of claim 14, wherein the instructions, when executed, cause the processor to further:

generate the depth map of the input image by performing depth estimation within the image to determine the depth values respectively associated with each pixel.

16. The synthesized view image generation system of claim 14, wherein setting the depth values of the pixels in the dilated depth map is performed when a difference between the local minimum depth value and local maximum depth value of the depth map exceeds a predetermined threshold difference in depth value.

17. The synthesized view image generation system of claim 14, the system further comprising a multiview display screen and wherein the plurality of instructions, when executed, further cause the synthesized view image to be displayed on the multiview display screen.

* * * * *